(12) United States Patent
Lundin (10) Patent No.: US 10,633,814 B2
(45) Date of Patent: Apr. 28, 2020

(54) OIL COLLECTING DEVICE

(71) Applicant: M & L Patent Oy Ab, Hanko (FI)

(72) Inventor: Lars Lundin, Hanko (FI)

(73) Assignee: M & L Patent Oy Ab, Hanko (FI)

( * ) Notice: Subject to any disclaimer, the term of this patent is extended or adjusted under 35 U.S.C. 154(b) by 0 days.

(21) Appl. No.: 15/764,335

(22) PCT Filed: Sep. 30, 2016

(86) PCT No.: PCT/FI2016/050683
§ 371 (c)(1),
(2) Date: Mar. 29, 2018

(87) PCT Pub. No.: WO2017/055690
PCT Pub. Date: Apr. 6, 2017

(65) Prior Publication Data
US 2018/0282964 A1 Oct. 4, 2018

(30) Foreign Application Priority Data
Sep. 30, 2015 (FI) ...................................... 20150271

(51) Int. Cl.
*E02B 15/10* (2006.01)
*B01D 17/02* (2006.01)
(Continued)

(52) U.S. Cl.
CPC ............ *E02B 15/103* (2013.01); *B01D 17/02* (2013.01); *C02F 1/40* (2013.01); *C02F 2101/32* (2013.01); *Y02A 20/204* (2018.01)

(58) Field of Classification Search
CPC ...... E02B 15/10; E02B 15/102; E02B 15/103; C02F 1/40
(Continued)

(56) References Cited

U.S. PATENT DOCUMENTS

| 4,264,450 A | * | 4/1981 | Ayers | .................... E02B 15/102 |
| | | | | 210/242.4 |
| 5,137,630 A | * | 8/1992 | Eklund | ................. E02B 15/102 |
| | | | | 210/242.3 |

(Continued)

FOREIGN PATENT DOCUMENTS

| CN | 101761061 A | 6/2010 |
| EP | 0128729 A2 | 12/1984 |

(Continued)

*Primary Examiner* — Christopher Upton
(74) *Attorney, Agent, or Firm* — Laine IP Oy (57) ABSTRACT

Two segments according to the invention, which form a brush structure created by brush fibres and plastic rings, are joined together by bolts or screws and sleeves with a water-permeable discoid hub, in such a way that a separate brush structure can be joined to the segments by stud bolts or similar, to the metal ring of which a plastic ring, equipped with brush fibres, is attached for the collection of very heavy oils. For the cleaning of the brush fibres of the segment and the good recovery of the oil being collected, there is a curved metal sheet, preferably on supports, as a continuation of the cleaner, and which forms a casing-like space, preventing the oil flowing off the brushes from returning to the water circulation and improving the collection capacity. The device is suitable, for instance, for the collection of all grades of oil, with continuously changing properties.

11 Claims, 11 Drawing Sheets

(51) Int. Cl.
*C02F 1/40* (2006.01)
*C02F 101/32* (2006.01)

(58) Field of Classification Search
USPC .......... 210/242.3, 242.4, 523, 540, 923, 924
See application file for complete search history.

(56) References Cited

U.S. PATENT DOCUMENTS

| | | | | |
|---|---|---|---|---|
| 6,372,134 | B1 * | 4/2002 | Larsen | E02B 15/104 |
| | | | | 210/242.3 |
| 8,388,839 | B1 * | 3/2013 | Hobson | E02B 15/102 |
| | | | | 210/242.4 |
| 8,741,133 | B2 * | 6/2014 | Hobson | E02B 15/102 |
| | | | | 210/242.4 |

FOREIGN PATENT DOCUMENTS

| | | |
|---|---|---|
| FI | 123412 B | 4/2013 |
| FI | 20125704 A | 12/2013 |
| FI | 20135966 A | 3/2015 |
| WO | WO9739194 A1 | 10/1997 |
| WO | WO2014001613 A1 | 1/2014 |
| WO | WO2014188075 A1 | 11/2014 |

\* cited by examiner

OIL COLLECTING DEVICE

FIELD OF TECHNOLOGY

The present invention relates to an oil-collection device which includes a brush structure based on a plastic ring equipped with brush fibres. Such a device includes a brush structure, which is intended for the collection of oil, in particular it is intended for the collection of crude oil, which continuously changes its properties.

BACKGROUND

A previously known brush structure, which relates to a collector intended for ice conditions, according to Finnish patent application 20125704 (WO2014001613), has an oil-collecting brush structure that is, in its type properties, intended to be applied to the collection of all grades of oil. When moving from ice conditions to other conditions the greatest problem with the collector is its load-bearing frame. The need for the frame is questionable, indeed it can be even unnecessary. For this reason, a structural change is needed in the brush application, which will achieve a new philosophy and be more suitable for the collection of oil. Instead of the old frame-brush combination, a new brush application is required, which operates in waves, which has good penetration in a water flow, and which has an effective capacity.

SUMMARY OF THE INVENTION

The invention is intended to eliminate at least some of the aforementioned drawbacks and create a new brush application, in which an oil-collecting brush structure and a cleaning element are fitted together in such a way that a segment can be formed to act as a collecting component in all conditions. In addition, the intention is to manufacture the segments in such a way that a separate brush structure can be combined with them particularly for the collection of heavy oils.

Considerable advantages are gained with the aid of the invention. Thus, with the aid of the solution a new type of structure with a collector of several segments is created from the oil-collecting device, which is installed in oil-collecting devices or apparatuses, with the aim of collecting all possible grades of oil. In its type properties, the device according to the invention is indeed suitable for the collection of all grades of oil, even very heavy oils. The device is then suitable for collecting, for instance, crude oil with continuously changing properties.

BRIEF DESCRIPTION OF THE DRAWINGS

In the following, embodiments are described in detail with reference to the accompanying drawings, in which.

DETAILED DESCRIPTION OF EMBODIMENTS

The point of departure of the invention is a segment, which is formed by a brush structure created by brush fibres and a plastic ring, in which the annular brush-fibre rows are attached to cover a wide surface area of the plastic ring. Two of the brush structures are combined opposite to each other, for example with bolts and sleeves, together with a water-penetrable discoid hub, in such a way that a separate brush structure can be combined with the segment for the collection of very heavy oils.

The hub made from metal or similar is intended, together with the plastic rings, to create and reinforce the load-bearing structure of the segment.

Between the hubs, it is intended to use sleeves or similar attachment solutions, which, together with the hubs, correspond in dimension to the combined length of the fibres and determine the lengths of the points of the cleaner, and the distances and angles between the plastic rings.

In one embodiment, the plastic rings are mutually interchangeable. Most suitably they are shaped in such a way that a second plastic ring equipped with brush fibres can joined to one ring, in order to form a brush segment.

In one embodiment, a raised inner part is formed in a metal ring or at least one plastic ring, and a recess is formed in at least one plastic ring or correspondingly a metal ring, the inner edge of which corresponds laterally to the outer edge of the raised inner part, so that the rings set opposite to each other can be wedged onto each other by pressing the raised inner part into the recess. The lateral outer edge of the raised inner part can have a corrugated inner edge, which is able to conform to the raised inner part, so that the rings can be firmly wedged onto each other.

The prior art of the cleaner is in the publication PCT/FI2014/050393 (WO 2014188075). The use of sleeves also facilitates the assembly of the segments. When combining several segments, certain sleeves must have a construction that can be penetrated by a bolt.

In principle, the combined segments form a self-supporting structure, in which the hub-shaft combination attached to both ends of the segments is sufficient. Thus, in place of the hubs between the segments there are only rings, which releases empty space inside the structure and lightens the weight of the structure.

To improve capacity, a controllable curved sheet of metal on supports, of the sleeve-length and hub-width and the necessary dimensional extent can be situated in the space between the plastic rings to act as a continuation of the cleaner. The curved sheet forms a casing-like space for the brush fibres, which prevents the oil flowing off the brushes from returning to the water circulation, and thus improves the collection capacity.

For the demands of collecting very heavy oils, a separate brush structure has been designed, in which a plastic ring equipped with brush fibres is combined with a metal ring or similar and attached to the segment, for example by stud bolts.

In one embodiment, in the plastic-ring segment there are first brush fibres, which are mainly on the first side of the plastic ring and arranged transversely to the plane of the ring, and second brush fibres, which are arranged on the circumference of the plastic ring at least mainly parallel to the plane of the plastic ring or at most at an angle of 45 degrees to it.

Already known technology can be used for cleaning the separate brush structure. Also for special situations, when a natural through-flow of the water does not happen, the device's volume can be exploited to create improved water movement by attaching tight covers and water-removal pipes for removing water to both ends of the segments, for example, using sliding bearings.

Preferred embodiments are examined in greater detail with the aid of the accompanying drawings.

Figure 1:
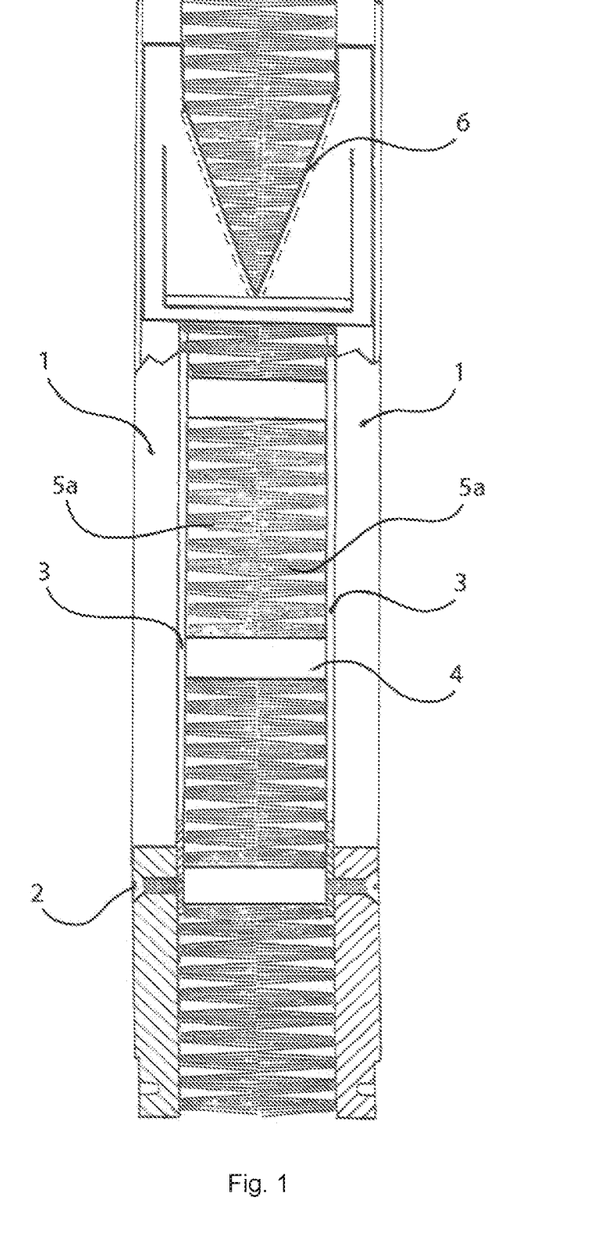
FIG. 1 shows the structure of a segment and part of it in partial cross-section, as well as the points of the cleaner relative to the segment.

FIG. 1 shows a segment, in which a plastic ring 1, hubs 3, and sleeves 4 are joined by screws 2. In addition, the figure shows the combined length of fibres 5a oriented opposite to each other, the dimension of which determines the distance and angle of the cleaner's points 6.

Figure 2A:
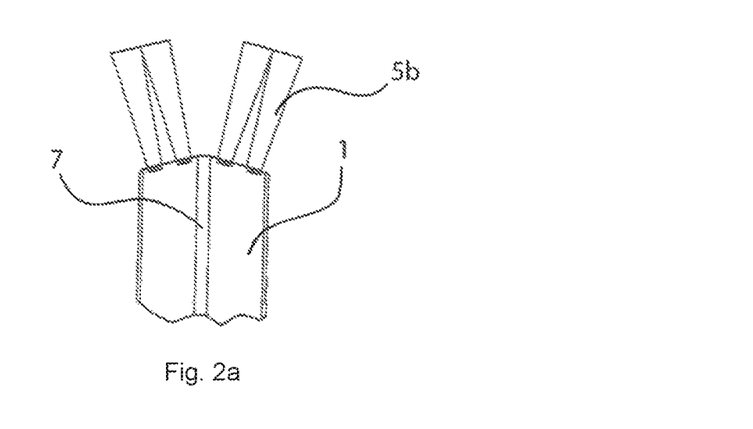
FIG. 2a shows part of a separate brush structure and FIG. 2b a schematic image of two adjacent segments combined.

FIG. 2a shows part of a separate brush structure, in which there is a plastic ring 1, to which brush fibres 5b are attached for the collection of heavy oils, on both sides of a metal ring 7 or similar.

Figure 2B:
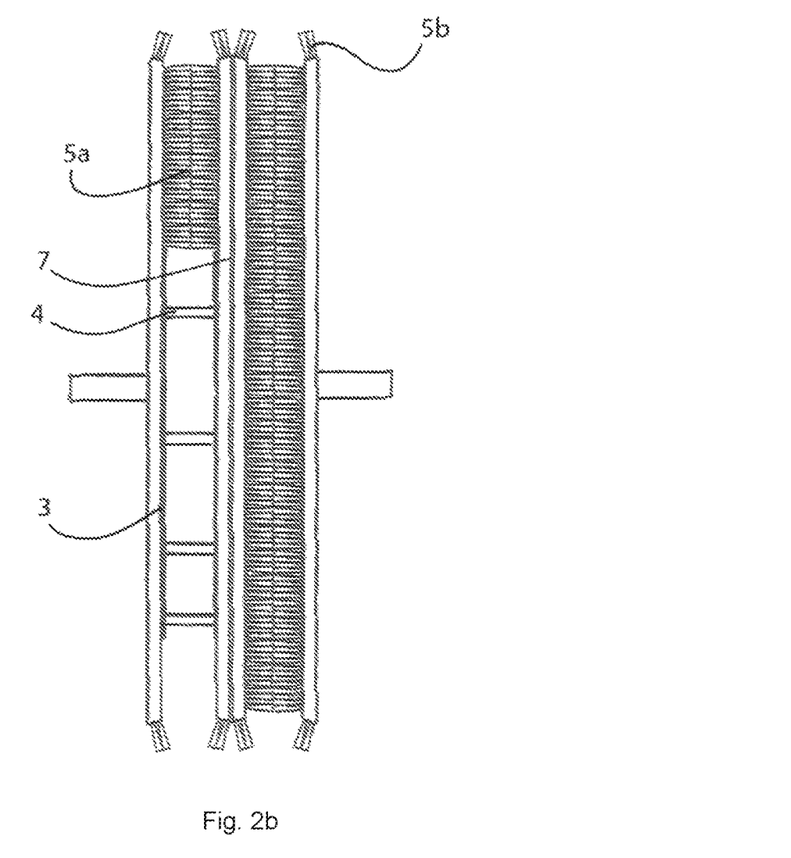

FIG. 2b shows a front view of a device with two segments, equipped with a shaft 10, and in which there are plastic rings 1 of a separate brush structure of combined segments, to which are attached brush fibres 5b for the collection of heavy oils. In addition, the figure shows segments, in which there are fibres 5a, the combined length of which corresponds to the combined width of the sleeves 4 and hubs 3.

Figure 3A:
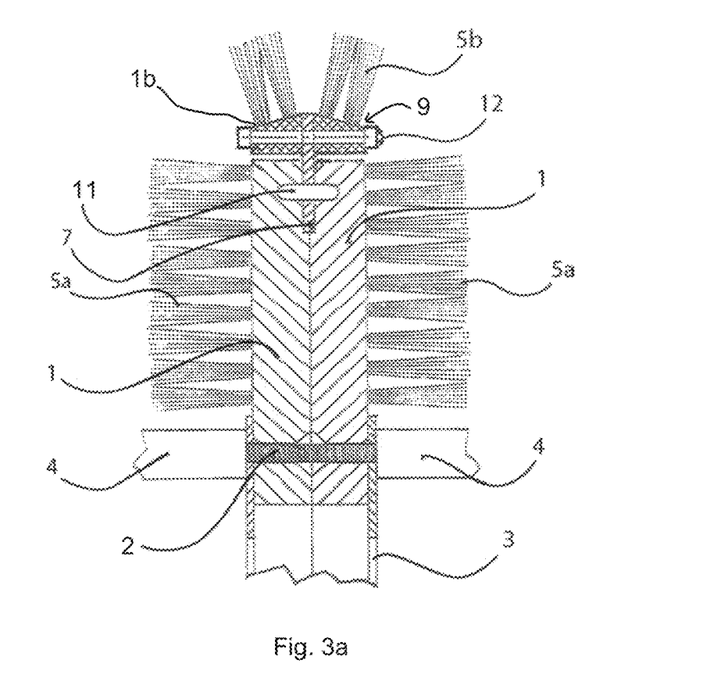
FIG. 3a shows part of two plastic rings arranged against each other, which form a segment, in which there are brush structures joined by bolts and a separate brush structure.

FIG. 3a shows a cross-sectioned part of a segment, in which plastic rings 1 equipped with brush fibres 5a and hubs 3 are combined using screws 2 and sleeves 4. The figure also shows a cross-sectioned separate brush ring 9, attached to combined plastic rings 1 by stud bolts 11 or a similar structure, in which the plastic rings 1b, to which brush fibres 5b for the collection of heavy oils, are attached by long bolts 12 to both sides of the metal ring 7.

Figure 3B:
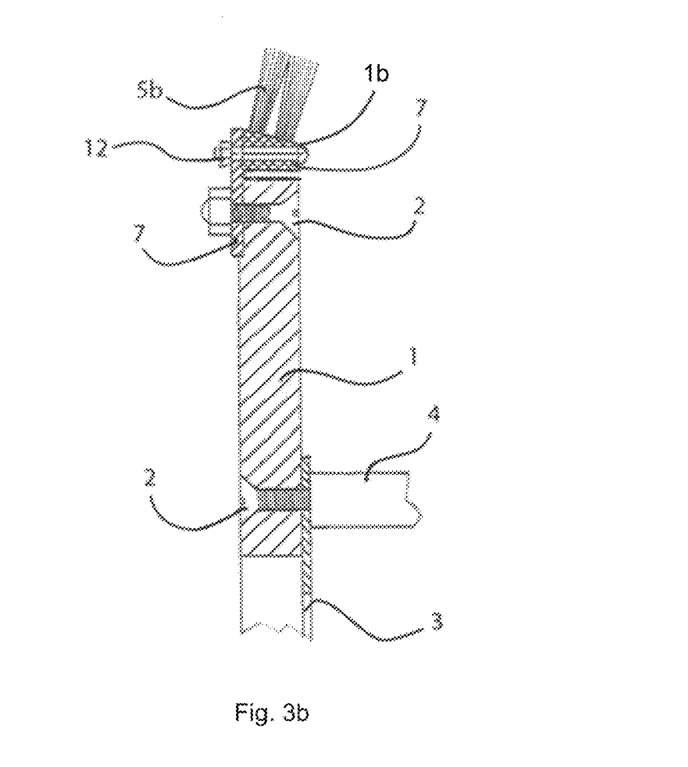
FIG. 3b shows a plastic ring and a metal ring equipped with brush fibres, which rings are attached to each other.

FIG. 3b shows a cross-sectioned plastic ring 1, which a hub 3 is joined by screws 2 and sleeves 4. The figure also shows plastic rings 1b, to which brush fibres 5b are attached for the collection of heavy oils, attached by bolts 12 to a cross-sectioned separate brush-structure metal ring 7 attached by screws 2 to a plastic ring 1.

Figure 4A:
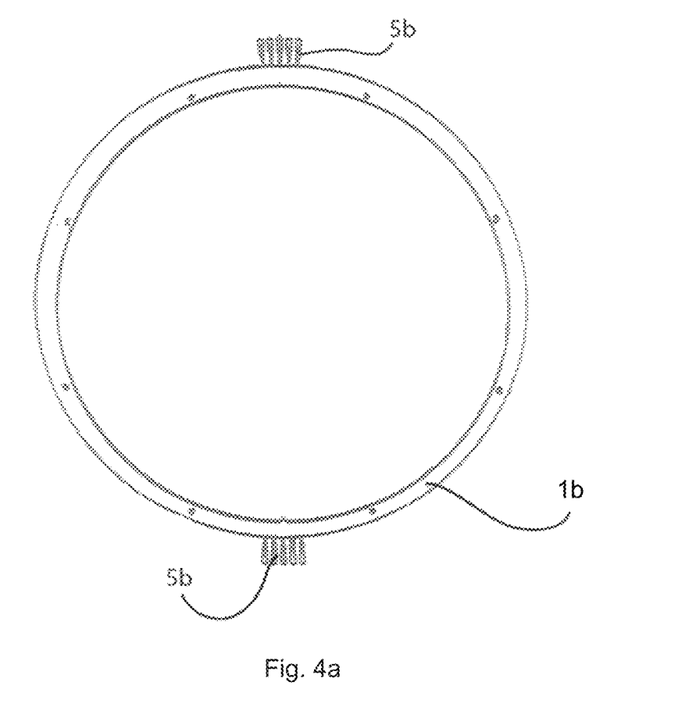
FIGS. 4a and 4b show the parts of the separate brush structure for collecting heavy oil.

FIG. 4a shows a side view of a separate brush-structure plastic ring 1b, to which brush fibres 5b are attached for the collection of heavy oils.

Figure 4B:
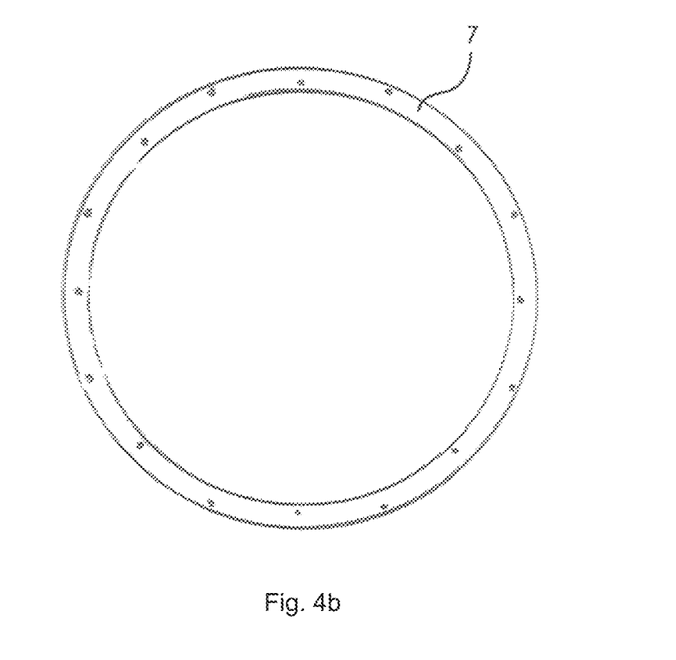

FIG. 4b shows a side view of a metal ring 7 or similar structure.

Figure 5:
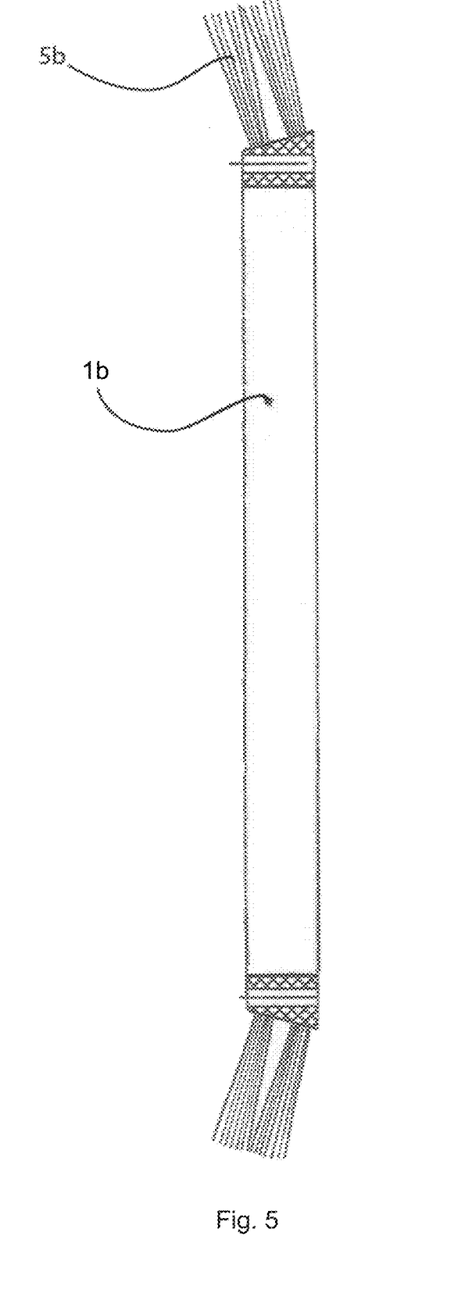
FIG. 5 shows the oil-collecting parts belonging to the separate brush structure.

FIG. 5 shows a cross-sectioned separate brush-structure plastic ring 1b, to which brush fibres 5b are attached for the collection of heavy oils.

Figure 6:
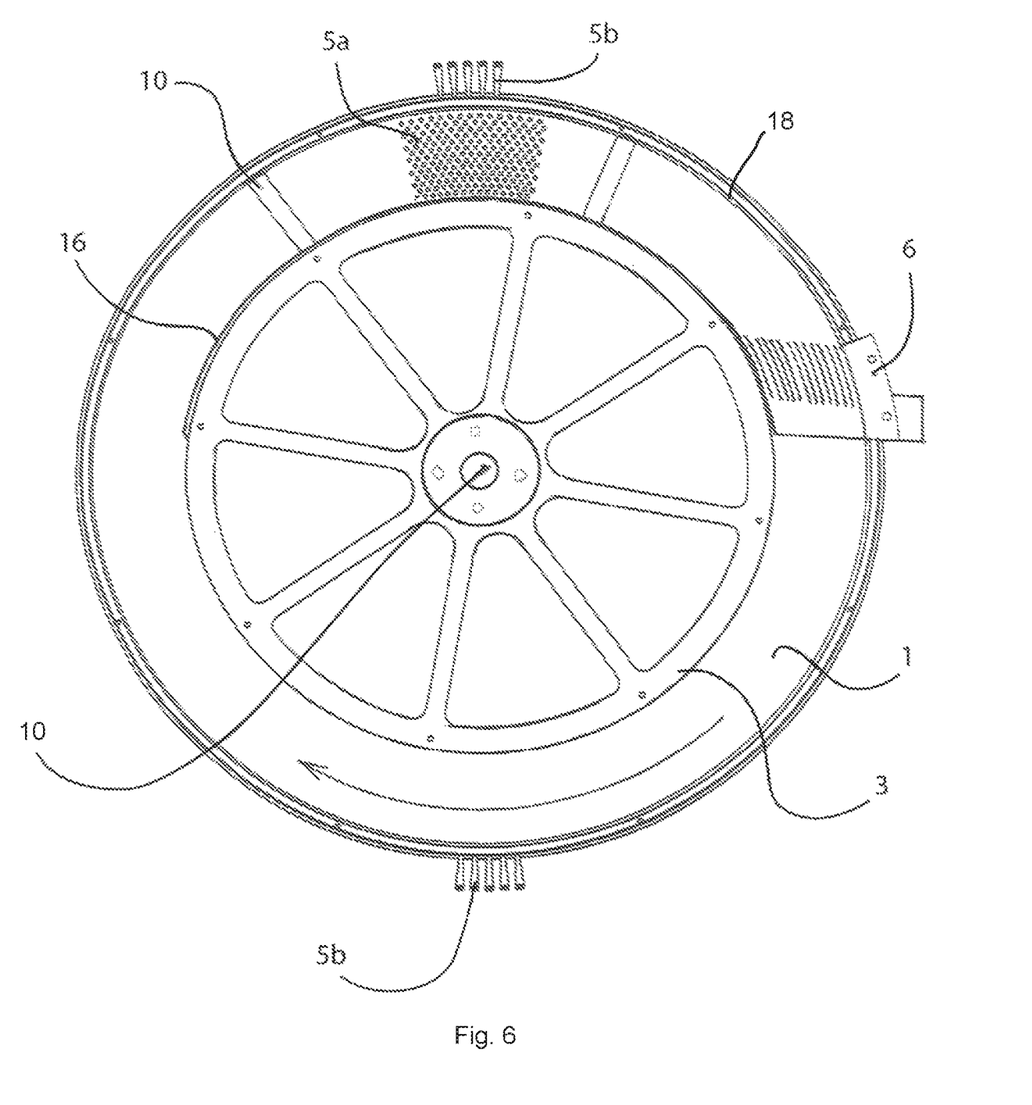
FIG. 6 shows a side view of the parts of the segment and the separate brush structure.

FIG. 6 shows a cross-section of the separate parts of the device, in which the outer circumference is surrounded by a separate brush-structure brush ring 1b with brush fibres 5b attached to it for the collection of heavy oils. In addition, the figure shows some of the annular brush-fibre rows 5a of a plastic ring 1, attached to cover a wide surface area of the plastic ring 1, as well as a controllable curved sheet 18, which acts as a continuation of the cleaner 6, on supports conforming to the outer circumference of the hub 3, and a shaft 10 for rotating the segments of the device. The curved sheet 18 forms a casing-like space, thus preventing the oil flowing off the brushes from returning to the water circulation, and thus improving the collection capacity.

Figure 7:
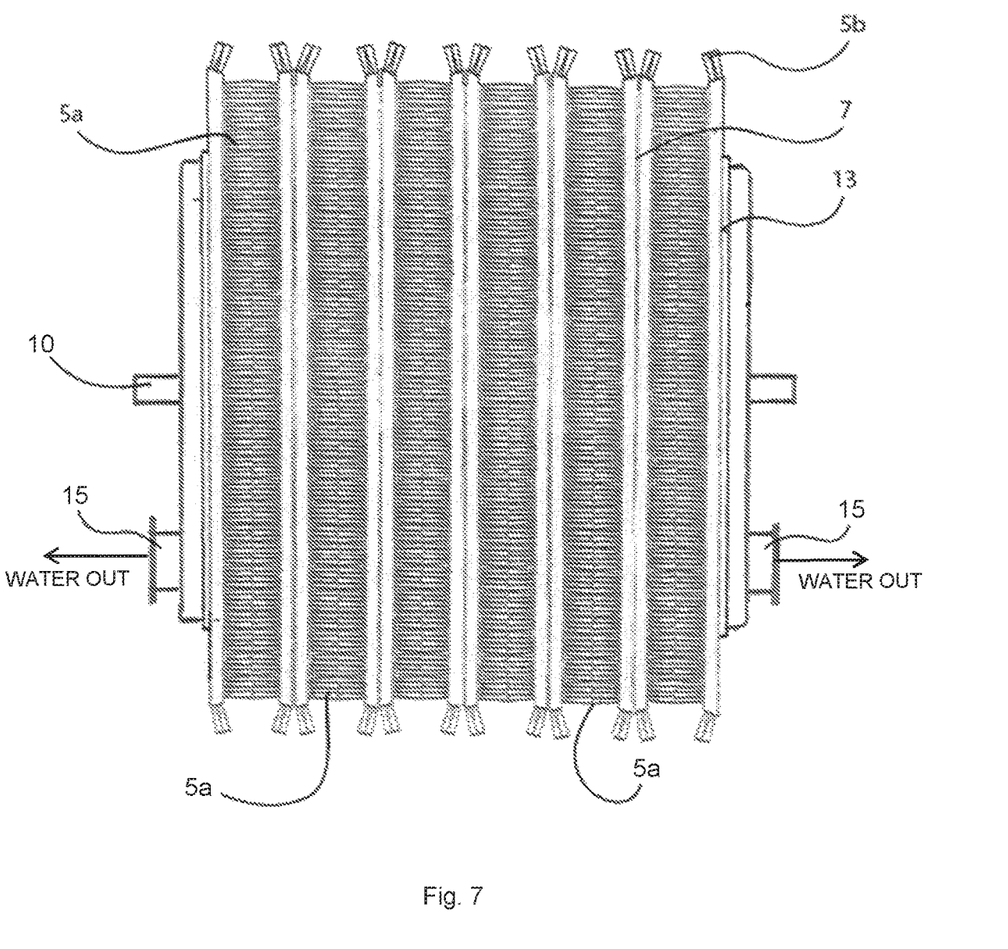
FIG. 7 shows a front view of the combined segments of the device, and the closed covers and water-removal pipes installed in both ends of them.

FIG. 7 shows a front view of the device assembled from combined segments, by exploiting the volume space of which tight covers 16, equipped with water-removal pipes 15 for emptying the volume space, and equipped with sliding bearings 13 are installed on both ends of the segments. In addition, the figure shows the brush fibres 5a of the device's segments and the plastic rings 1 of a separate brush structure together with the brush fibres 5b attached to them, as well as a shaft 10 for rotating the device's segments.

Figure 8:
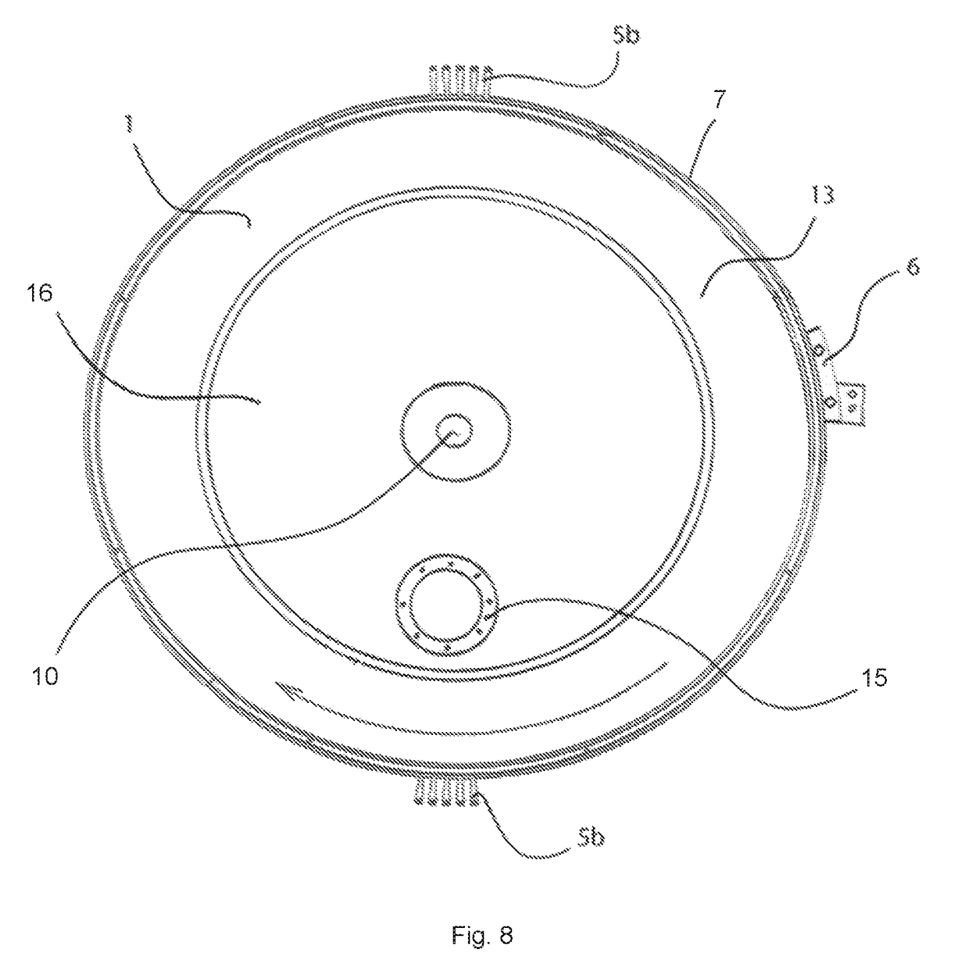
FIG. 8 shows segments from the end of the device and the closed covers and water-removal pipes installed in the ends, FIG. 9 show a cross-sectioned side view of an alternative construction.

FIG. 8 shows an end view of the device, in which at the end of the segment there is a tight cover 16 equipped with sliding bearings 13 and water-removal pipes 17. In this way, boosted oil removal is achieved. In addition, the figure shows a separate brush-structure metal ring 7, surrounding the outer circumference of the device's plastic ring 1, and the brush fibres 5b attached to it for the collection of heavy oils, as well as a shaft 10 for rotating the device's segments.

Figure 9:
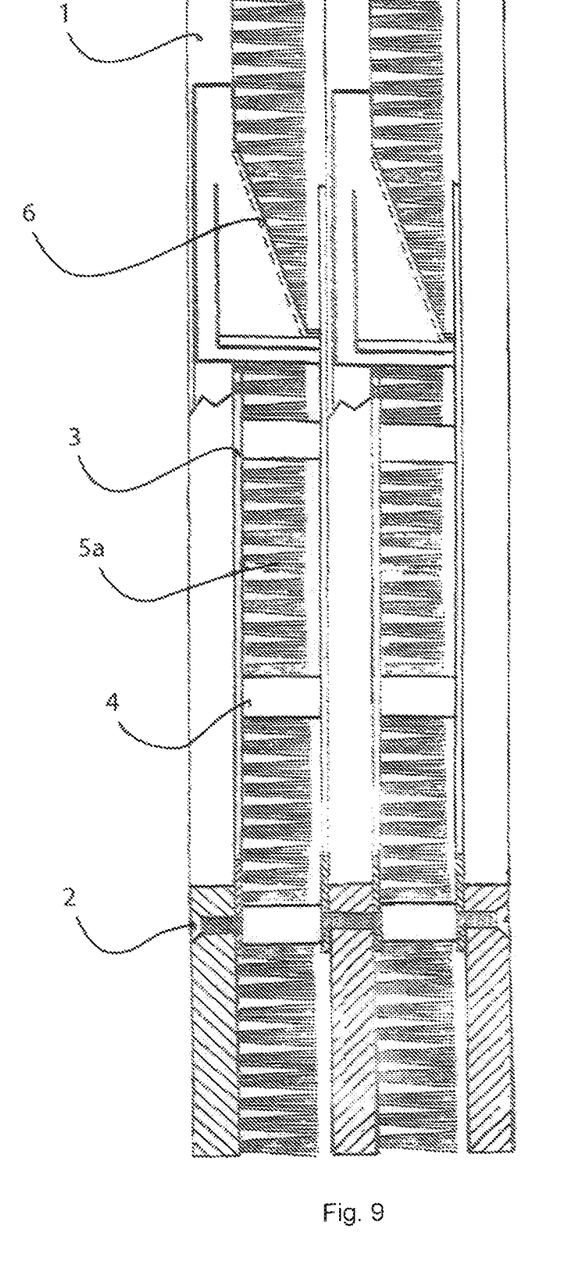

FIG. 9 shows an alternative embodiment of the structure of FIG. 1, in which the plastic rings are arranged consecutively, in such a way that their brush fibres 5a are oriented in the same direction.

Figure 10A:
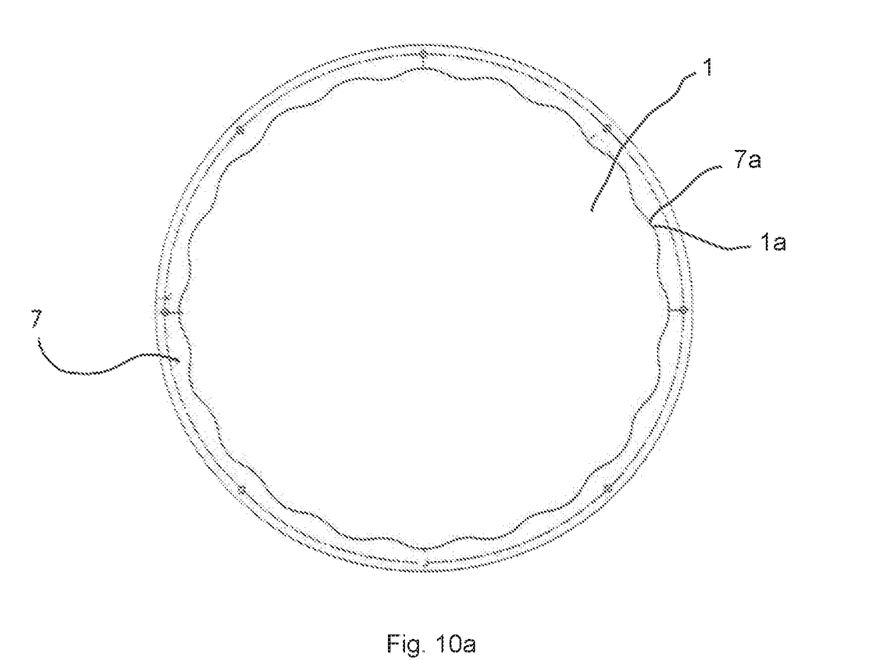
FIG. 10a shows a side view of an alternative construction of the metal ring and FIG. 10b correspondingly an alternative construction of the plastic ring.
Figure 10B:
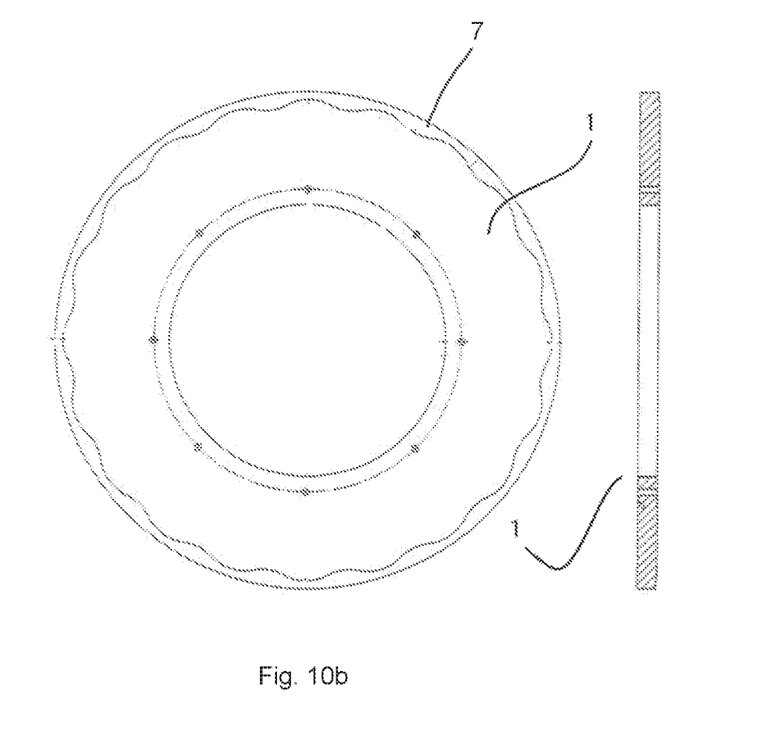

FIG. 10a shows an alternative construction of the metal ring 7, and FIG. 10b shows a construction of the plastic ring 1 fitting against the metal ring 7 of FIG. 10a. More specifically, in the metal ring 7 there is a raised inner part 7a, the lateral outer edge of which has a corrugated outline, when a recess 1a is formed in the plastic ring 1, the inner edge of which is corrugated so that it conforms to the metal ring 7. The metal ring 7 and correspondingly the plastic ring 1 can, of course, also be made in such a way that there is a recess in the metal ring and a raised part in the plastic ring. By means of the shaping described, the mutual alignment of the rings can be ensured.

In the solutions of FIGS. 10a and 10b, the plastic and metal rings can be pressed against each other and wedge-locked to each other. The attachment can be further ensured by screws or bolts (not shown).

Figure 11A:
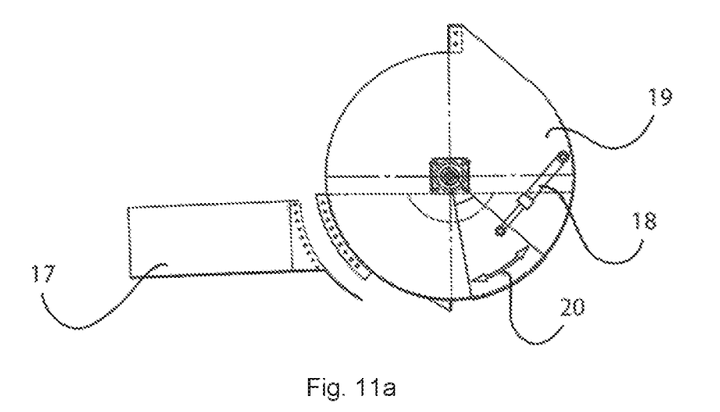
FIGS. 11a and 11b are schematic drawings, which show as a side view (FIG. 11a) and correspondingly a top view (FIG. 11b) of a casing in which the structure according to an embodiment of the invention is located.
Figure 11B:
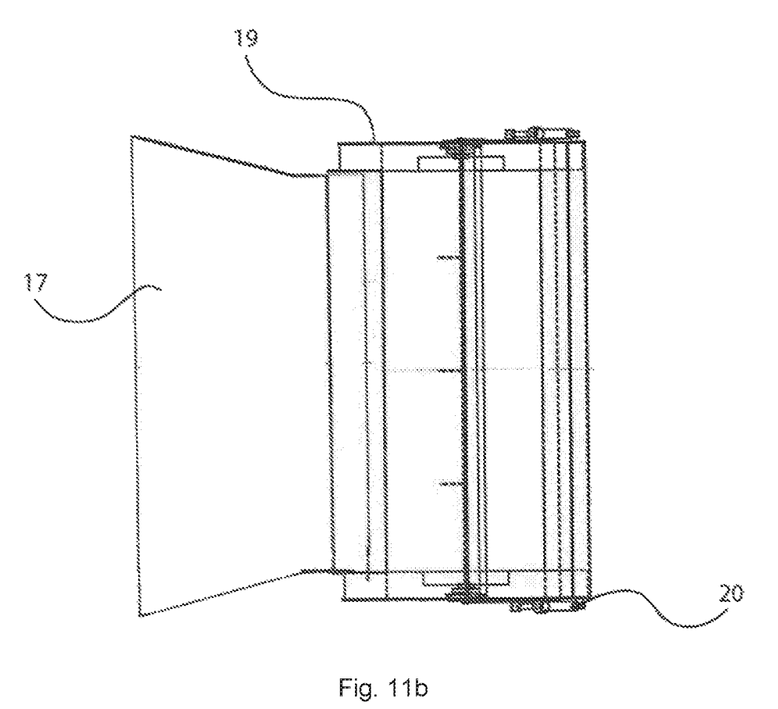

FIGS. 11a and 11b show a casing 19, in which a brush-structure segment according to the technology presented is situated. In the lower part of the casing, a water-removal opening 20 is arranged, with an opening the width of which can be set using, for example, a cylinder 18. In front of the device is a trough acting as a water guide, by means of which the water to be cleaned can be guided towards the brush-structure segments in the casing. The cleaned water is removed through the opening 20.

The following embodiments represent preferred solutions:

1. Brush structure collecting oils of grades with all type properties, based on a plastic ring equipped with brush fibres, in which the plastic rings 1, equipped with brush fibres 5 and discoid hubs 3, combined using sleeves 4 form a segment, can be joined, and to which a separate brush-structure can be joined for the collection of very heavy oils.

2. Segment according to embodiment 1, in which a separate brush structure is formed by attaching a plastic ring 1b equipped with brush fibres 5b to a metal ring 7 or similar, for the collection of very heavy oils.

3. Segment according to embodiment 1, in which a curved metal sheet 18 on supports 12 conforms to the outer circumference of the hub 3.

4. Segment according to embodiment 1, in which there are hubs 3 and a sleeve 4 attached by screws 2 to the plastic ring 1, the combined width of which in length corresponds to the combine length of the fibres 5 and determines the length, distance, and angle of the points 6 of the cleaner to the plastic rings 1.

5. Segment according to embodiment 1, in which closed covers 16, in which there are water-removal pipes 15, and which are equipped with sliding bearings 13, are installed in the ends of the segment or combined segments.

6. Segment according to embodiment 1, in which a separate brush-structure metal ring 8 can be attached to the plastic ring 1 by stud bolts 11 or similar.

7. Segment according to embodiment 1, in which the combined segments form a self-supporting structure, in which case simply a hub 3 shaft 10 formation attached to both ends of the segment and simply metal rings or similar in place of the other hubs 3 of segments will be sufficient.

8. Segment according to any of the above embodiments, which is formed by a brush structure created using brush fibres 5 and plastic rings 1; two segments are combined using bolts 12 or screws 2 and sleeves 4 with a hub 3 that is water-penetrable in construction and discoid in shape, in such a way that a separate brush structure 9, to the metal ring 7 of which a plastic ring 1b equipped with brush fibres 5b for the collection of very heavy oils is attached by bolts 12, can be joined to the segment by stud bolts 11 or similar. For the cleaning of the segment's brush fibres 5 and the good recovery of the oil being collected, there is, as a continuation of the cleaner 6, a curved metal sheet 18 on supports, which forms a casing-like space, thus preventing the oil flowing off the brushes from returning to the water circulation, and improving the collection capacity. For special situations, when the natural through flow of water does not occur, the volume space can be exploited by installing tight covers 16, equipped with sliding bearings 13, and their water-removal pipes 15 the removal of water, on both ends of the segment or combined segment, so that boosted oil collection will be achieved. The device's equipment includes a shaft 10 or shafts for rotating the segment.

9. Oil-collection device, which includes a brush structure, in which there is a plastic ring equipped with brush fibres, so that in the plastic ring there are first brush fibres 5a, which are mainly on the first side of the plastic ring, arranged transversely relative to the plane of the ring, and second brush fibres 5b, which are arranged on the circumference of the plastic ring at least mainly parallel to the plane of the plastic ring, when the second, opposite side of the plastic ring is shaped in such a way that a second plastic ring, equipped with brush fibres can be joined to it, so that the said plastic rings are mutually interchangeable.

The invention is not restricted to concern only the examples described above, but instead many variations are possible while remaining within the scope of the inventive idea defined by the Claims.

INDUSTRIAL APPLICABILITY

The invention is suitable for use in various conditions, even in waves, and it can be used to collect various oils from water, quite as well crude oil as lighter, refined fractions. The device is particularly well suited to the collection of heavy oils and crude oil with continuously changing properties.

REFERENCE NUMBERS 1, 1b plastic rings
2 screw
3 hub
4 sleeve
5a, b brush fibres
6 cleaner
7 metal ring
9 separate brush structure
10 shaft
11 stud bolt
12 long bolt
13 bearings
15 water removal pipes
16 closed cover of end
18 curved metal sheet
19 casing
20 opening

REFERENCES

WO 2014001613 A1

The invention claimed is:

1. An oil-collection device comprising;
a brush structure comprising plastic rings equipped with first brush fibres, wherein the plastic rings are joined to at least one discoid hub, so that the at least one hub and the plastic rings joined together form a brush segment, to which is joined a separate brush structure comprising second brush fibres for the collection of oils.

2. The oil-collection device according to claim 1, wherein the separate brush structure is formed by attaching a plastic ring equipped with the second brush fibres to a metal ring, wherein the metal ring is attached between the plastic rings equipped with the second brush fibres.

3. The oil-collection device according to claim 2, wherein a raised inner part is formed in the metal ring or at least one of the plastic rings, and a recess, the inner edge of which corresponds laterally to an outer edge of the raised inner part, is formed in at least the other of the plastic rings or the metal ring, so that when the rings are set next to each other they wedge together by pressing the raised inner part into the recess.

4. The oil-collection device according to claim 3, wherein a lateral outer edge of the raised inner part has a corrugated outline, in which case the recess formed in the plastic ring or the metal ring has a corrugated inner edge, so that the metal ring is able to conform to the raised inner part of the adjacent metal or plastic ring, when the plastic and metal rings are set opposite each other and are wedged onto each other.

5. The oil-collection device according to claim 2, wherein the metal ring comprises a raised inner part and the plastic rings comprise a recess corresponding to the raised inner part, or vice versa.

6. The oil-collection device according to claim 1, further comprising a curved metal sheet disposed on supports disposed between the plastic rings to conform to an outer circumference of a respective one of the hubs.

7. The oil-collection device according to claim 1, wherein a closed cover, comprises at least one water-removal pipes, is installed in an end of the brush segment.

8. The oil-collection device according to claim 1, wherein the brush segment comprises a self-supporting structure.

9. The oil-collection device according to claim 1, comprising a plurality of adjacent brush segments, which are arranged coaxially.

10. The oil-collection device according to claim 9, wherein a brush-segment row, formed from the plurality of adjacent brush segments is rotated around a longitudinal axis via a shaft connected to the segments.

11. An oil-collection device comprising a brush structure, in which there is a plastic ring equipped with brush fibres, wherein in the plastic ring there are first brush fibres, which are mainly arranged transversely relative to the plane of the ring, on the first side of the plastic ring, and second brush fibres, which are arranged on the circumference of the plastic ring at least mainly parallel to the plane of the plastic ring, or at an angle of at most 45 degrees to it, when the second, opposite side of the plastic ring is shaped in such a way that a second plastic ring equipped with brush fibres can be joined to it, which plastic rings are mutually interchangeable.

\* \* \* \* \*